United States Patent
Bhattacharya et al.

(10) Patent No.: US 12,027,070 B2
(45) Date of Patent: Jul. 2, 2024

(54) COGNITIVE FRAMEWORK FOR IDENTIFICATION OF QUESTIONS AND ANSWERS

(71) Applicant: INTERNATIONAL BUSINESS MACHINES CORPORATION, Armonk, NY (US)

(72) Inventors: Pinaki Bhattacharya, Pune (IN); Harish Bharti, Pune (IN); Rajeev Mittal, Gurgaon (IN); Anupama Ratha, New town (IN); Dinesh Wadekar, Pune (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 17/654,873

(22) Filed: Mar. 15, 2022

(65) Prior Publication Data
US 2023/0316943 A1    Oct. 5, 2023

(51) Int. Cl.
G09B 7/00        (2006.01)
G06F 40/58       (2020.01)

(52) U.S. Cl.
CPC ............. *G09B 7/00* (2013.01); *G06F 40/58* (2020.01)

(58) Field of Classification Search
CPC .................................. G09B 7/00; G06F 40/58
See application file for complete search history.

(56) References Cited

U.S. PATENT DOCUMENTS

| | | | |
|---|---|---|---|
| 11,030,913 B2 | 6/2021 | Panuganty | |
| 2002/0076112 A1* | 6/2002 | Devara | G06F 16/7844 382/229 |
| 2011/0059423 A1* | 3/2011 | Kadar | G09B 5/065 715/764 |
| 2017/0213469 A1* | 7/2017 | Elchik | G09B 7/02 |
| 2018/0260472 A1* | 9/2018 | Kelsey | G06F 40/56 |

(Continued)

FOREIGN PATENT DOCUMENTS

| | | |
|---|---|---|
| CN | 103235833 B | 2/2017 |
| CN | 111062842 A | 4/2020 |

OTHER PUBLICATIONS

Mell, et al., "The NIST Definition of Cloud Computing", National Institute of Standards and Technology, Special Publication 800-145, Sep. 2011, 7 pages.

*Primary Examiner* — Kang Hu
*Assistant Examiner* — Correll T French
(74) *Attorney, Agent, or Firm* — Jordan T. Schiller

(57) ABSTRACT

A computer-implemented method for providing a framework to identify questions and answers dynamically from a dataset based on previous learning and an evaluation score of a user. The method includes creating a library of potential questions and answers from the dataset based on the previous learning and evaluation score of the user, and generating a set of personalized questions, for the user, related to the dataset by utilizing sentence-based machine translation (SBMT) and natural language processing (NLP) tools. The method further includes identifying a plurality of answers for the set of personalized questions for the user, based on collective information available in the dataset, and providing, to the user, the plurality of answers for the set of personalized questions for verification and evaluation.

17 Claims, 5 Drawing Sheets

(56) References Cited

U.S. PATENT DOCUMENTS

| | | | |
|---|---|---|---|
| 2019/0287415 A1* | 9/2019 | Zavesky | ............... G09B 7/00 |
| 2019/0378429 A1* | 12/2019 | Panuganty | ............. G06F 40/10 |
| 2020/0265735 A1 | 8/2020 | Byron | |
| 2022/0292998 A1* | 9/2022 | Saxena | ............... G09B 5/125 |
| 2023/0068338 A1* | 3/2023 | Ramnani | .............. G06F 40/279 |

* cited by examiner

COGNITIVE FRAMEWORK FOR IDENTIFICATION OF QUESTIONS AND ANSWERS

BACKGROUND

The present invention relates generally to the field of Natural Language Processing (NLP), and more particularly to text analytics.

Nowadays, in this competitive era, learning is very important for everyone and at the same time, it is very important to keep evaluating an individual's learning process.

However, current technology limits how someone can have questions created dynamically on specific content (i.e., reading material, tests, etc.) since there is such a vast amount of material available and every person may read the same content for different purposes and every person may have different levels of understanding.

BRIEF SUMMARY

Embodiments of the present invention disclose a method, a computer program product, and a system.

According to an embodiment of the present invention, a method for providing a framework to identify questions and answers dynamically from a dataset based on previous learning and an evaluation score of a user. The method includes creating a library of potential questions and answers from the dataset based on the previous learning and evaluation score of the user and generating a set of personalized questions, for the user, related to the dataset by utilizing sentence-based machine translation (SBMT) and natural language processing (NLP) tools. The method further includes identifying a plurality of answers for the set of personalized questions for the user, based on collective information available in the dataset and providing, to the user, the plurality of answers for the set of personalized questions for verification and evaluation.

According to a further embodiment of the invention, a computer program product for processing natural language text on a computer includes program code embodied on a non-transitory tangible storage device. The program code is executable by a processor of a computer to perform a method. The method includes creating a library of potential questions and answers from the dataset based on the previous learning and evaluation score of the user and generating a set of personalized questions, for the user, related to the dataset by utilizing sentence-based machine translation (SBMT) and natural language processing (NLP) tools. The method further includes identifying a plurality of answers for the set of personalized questions for the user, based on collective information available in the dataset and providing, to the user, the plurality of answers for the set of personalized questions for verification and evaluation.

According to a further embodiment of the invention, a computer system for processing natural language text on a computer includes one or more computer devices each having one or more processors and one or more tangible storage devices. The system further includes a program embodied on at least one of the one or more storage devices. The program includes a set of program instructions for execution by the one or more processors. The program instructions cause the one or more processors to execute a method. The method includes creating a library of potential questions and answers from the dataset based on the previous learning and evaluation score of the user and generating a set of personalized questions, for the user, related to the dataset by utilizing sentence-based machine translation (SBMT) and natural language processing (NLP) tools. The method further includes identifying a plurality of answers for the set of personalized questions for the user, based on collective information available in the dataset and providing, to the user, the plurality of answers for the set of personalized questions for verification and evaluation.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The present disclosure discloses a method for providing a framework to identify questions and answers dynamically from a dataset based on previous learning and an evaluation score of a user.

The present disclosure draws on existing NLP research to explain the capabilities and limitations of text classifiers for academic study materials as well as other online/offline study materials. The novel framework disclosed herein is aimed to help students and technical experts address the formation of personalized questions and answers that may be directly, or indirectly, related to the context of the study materials at hand.

Currently, research methods in information extraction, automatic categorization and clustering, automatic summarization and indexing, and statistical machine translation need to be adapted to a new kind of data.

The present disclosure reviews the current research on NLP tools and methods for processing non-traditional information from social media data that is available in large amounts (i.e., big data) and shows how innovative NLP approaches can integrate appropriate linguistic information in various fields.

Nowadays, it is a scientific challenge to develop powerful methods and algorithms to extract relevant information from a large volume of data received from multiple sources and languages in various formats.

The present disclosure details a novel method to identify questions dynamically from study materials, considers the evaluation level of the user as well as the past learning of the user, and then identifies the possible answers for the identified questions, together with the best answer.

Hereinafter, exemplary embodiments of the present disclosure will be described in detail with reference to the attached drawings.

The present disclosure is not limited to the exemplary embodiments below but may be implemented with various modifications within the scope of the present disclosure. In addition, the drawings used herein are for purposes of illustration, and may not show actual dimensions.

Figure 1:
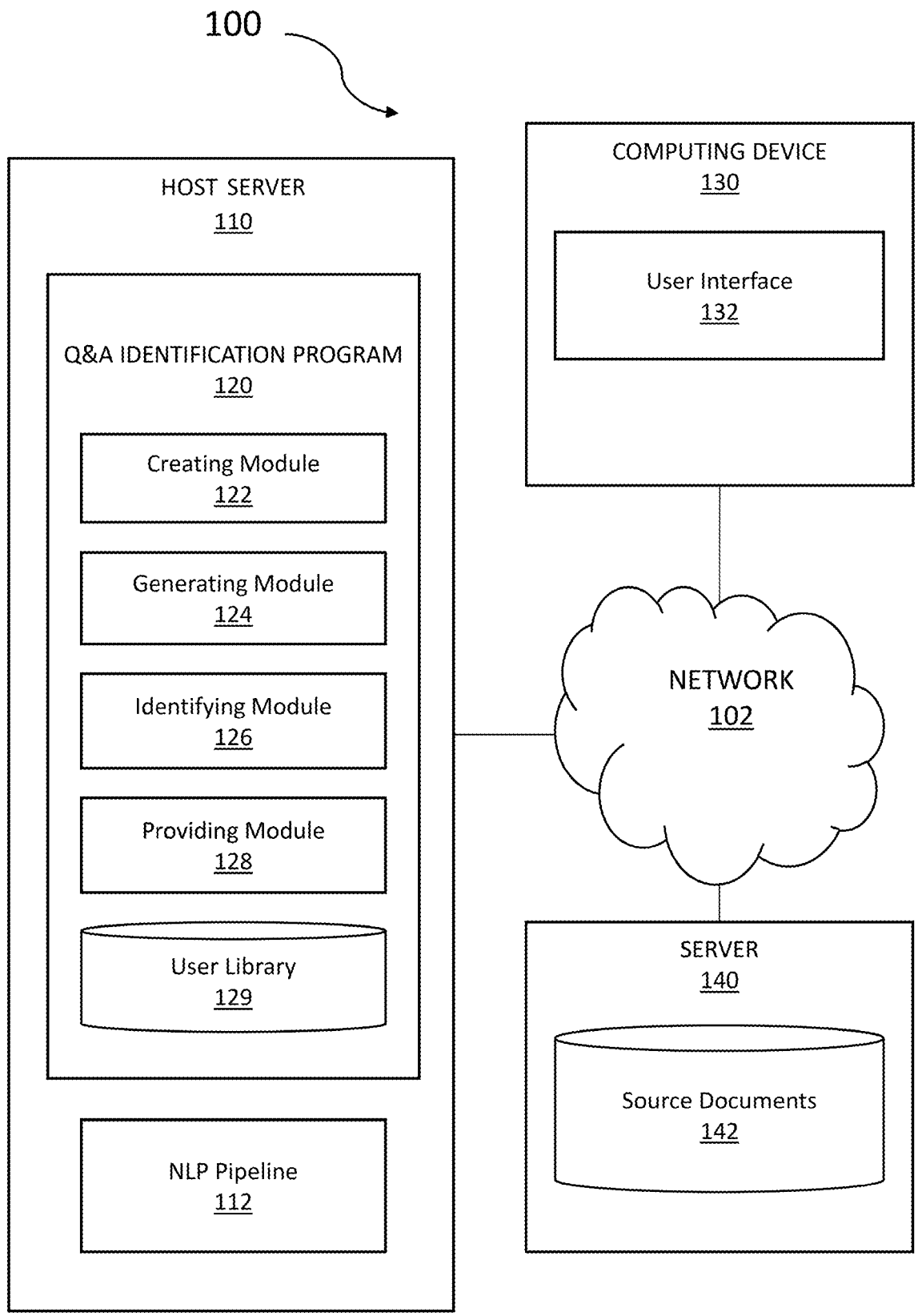
FIG. 1 is a block diagram illustrating a Q&A identifying environment, in accordance with an embodiment of the present invention.

FIG. 1 illustrates Q&A identification computing environment 100, in accordance with an embodiment of the present disclosure. Q&A identification computing environment 100 includes host server 110, computing device 130, and server 140 all connected via network 102. The setup in FIG. 1 represents an example embodiment configuration for the present disclosure and is not limited to the depicted setup to derive benefit from the present disclosure.

In an exemplary embodiment, host server 110 includes Q&A identification program 120. In various embodiments, host server 110 may be a laptop computer, tablet computer, netbook computer, personal computer (PC), a desktop computer, a personal digital assistant (PDA), a smart phone, a server, or any programmable electronic device capable of communicating with computing device 130 and server 140 via network 102. Host server 110 may include internal and external hardware components, as depicted, and described in further detail below with reference to FIG. 3. In other embodiments, host server 110 may be implemented in a cloud computing environment, as described in relation to FIGS. 4 and 5, herein. Host server 110 may also have wireless connectivity capabilities allowing the host server 110 to communicate with computing device 130, server 140, and other computers or servers over network 102.

With continued reference to FIG. 1, computing device 130 includes user interface 132 and may be a laptop computer, tablet computer, netbook computer, personal computer (PC), a desktop computer, a personal digital assistant (PDA), a smart phone, or any programmable electronic device capable of communicating with host server 110 and server 140 via network 102. Computing device 130 may include internal and external hardware components, as depicted, and described in further detail below with reference to FIG. 3. In other embodiments, computing device 130 may be implemented in a cloud computing environment, as described in relation to FIGS. 4 and 5, herein.

In exemplary embodiments, user interface 132 is a computer program which allows a user to interact with computing device 130 and other connected devices via network 102. For example, user interface 132 may be a graphical user interface (GUI). In addition to comprising a computer program, user interface 132 may be connectively coupled to hardware components, such as those depicted in FIG. 3, for receiving user input. In an exemplary embodiment, user interface 132 may be a web browser, however in other embodiments user interface 132 may be a different program capable of receiving user interaction and communicating with other devices.

With continued reference to FIG. 1, server 140 comprises source documents 142 and may be a laptop computer, tablet computer, netbook computer, personal computer (PC), a desktop computer, a personal digital assistant (PDA), a smart phone, or any programmable electronic device capable of communicating with host server 110 and computing device 130 via network 102.

In exemplary embodiments, source documents 142 are a corpora of documents which detail annotated bodies of subject specific data. Documents within source documents 142 may be structured, i.e., include metadata, or unstructured and are written in programming languages of common file formats such as .docx, .doc, .pdf, .rtf, etc.

In further embodiments, source documents 142 may include handwritten or documents scanned into electronic form which have no associated metadata. Source documents 142 may further include collective information within a dataset such as pictures, images, diagrams, graphs, texts, speech, and so forth.

With continued reference to FIG. 1, host server 110 includes Q&A identification program 120 as well as NLP pipeline 112. Host server 110 may be a laptop computer, tablet computer, netbook computer, personal computer (PC), a desktop computer, a personal digital assistant (PDA), a smart phone, or any programmable electronic device capable of communicating with computing device 130 and server 140 via network 102.

In exemplary embodiments, NLP pipeline 112 is a software application which can receive, analyzing, and understanding natural human language. In exemplary embodiments, NLP pipeline 112 comprises dictionaries, rules, statistical models, relational databases, and semantic rules to make a meaningful text analysis of data, such as the data contained in source documents 142. NLP pipeline 112 is made up of several components. In several parlances, these components are called "annotators" since they annotate meaning to a span of text, or images. The annotators include an annotation type, a span, and potentially other attributes, enough to tell a user what is interesting (or relevant), where it is located, and why it is interesting (or relevant). To develop highly precise annotators that could handle these various formatting constructs, the annotators would have to be developed specifically to understanding the text format code/language.

In exemplary embodiments, NLP pipeline 112 incorporates a novel hybrid approach to understanding the language of each of the sentences within a dataset and proposing higher probability questions driven from the content which may relate to one topic of the subject or many topics of the defined subject.

In exemplary embodiments, a support vector machine (SVM) may be used to discriminate the various subject categories of source documents 142 (e.g., images, graphs, text, etc.). Classification parameters are calculated using support vector machine learning. This process analyzes the data to find an optimal way to classify source documents 142 into their respective classes.

The subject disclosure provides a novel framework and method to identify questions dynamically from a learning/study material considering the evaluation level required and the past learning of the user, and then identifying possible answer(s) to the question(s), together with the best answer. The framework and method also considers the information available via diagrams and pictures while extracting the questions and answers. The framework matures with time as it learns with the same content, while extracting questions and answers.

With continued reference to FIG. 1, Q&A identification program 120, in an exemplary embodiment, may be a computer application on host server 110 that contains instruction sets, executable by a processor. The instruction sets may be described using a set of functional modules. In exemplary embodiments, Q&A identification program 120 may receive input from computing device 130 and server 140 over network 102. In alternative embodiments, Q&A identification program 120 may be a computer application on computing device 130, or a standalone program on a separate electronic device.

With continued reference to FIG. 1, the functional modules of Q&A identification program 120 include creating module 122, generating module 124, identifying module 126, and providing module 128.

In exemplary embodiments, the delineated modules of Q&A identification program 120 provide a framework for identifying questions and answers dynamically from a dataset, based on previous learning and an evaluation score of a user.

Figure 2:
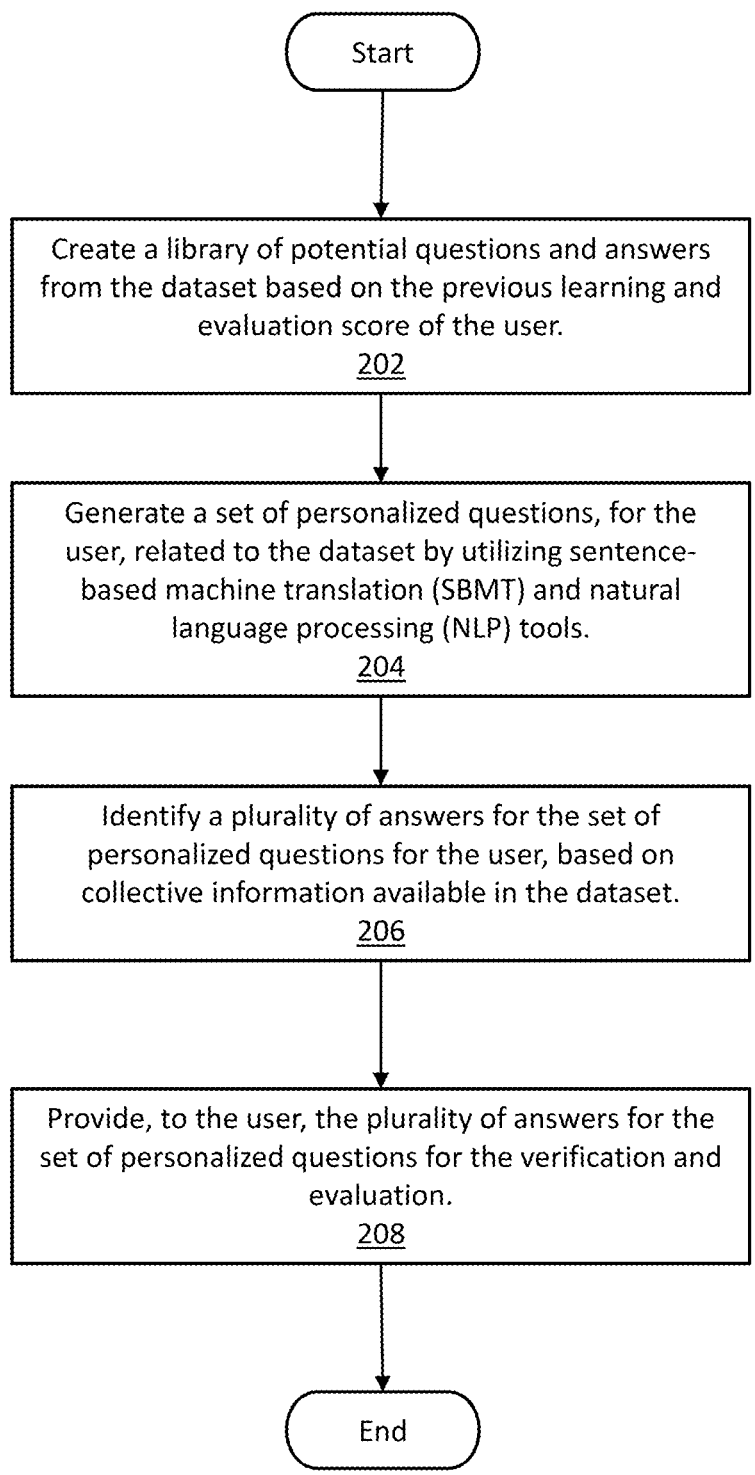
FIG. 2 is a flowchart depicting operational steps Q&A identifying program of FIG. 1, in accordance with an embodiment of the present invention.

FIG. 2 is a flowchart illustrating the operation of Q&A identification program 120 of FIG. 1, in accordance with embodiments of the present disclosure.

With reference to FIGS. 1 and 2, creating module 122 includes a set of programming instructions in Q&A identification program 120, to create a library of potential questions and answers from a dataset based on the previous learning and evaluation score of a user (step 202). The set of programming instructions is executable by a processor.

In exemplary embodiments, the created library of potential questions and answers from a dataset, based on users' previous learning and evaluation scores, are stored in user library 129. Evaluation scores may include relevance of subject matter to the users' interests, skill/academic level, or any other such feature that may be calculated, ranked, and/or scored.

Q&A identification program 120 performs an information extraction, automatic categorization, clustering, automatic summarization, indexing, and statistical machine translation on a large set of content (i.e., the dataset).

In exemplary embodiments, Q&A identification program 120 then provides a set of questions related to a topic or material being studied by an individual. Creating module 122 creates a library of all possible questions from the target learning material of the individual, considering previous learning materials and evaluation scores of the individual. In this fashion, the created questions are targeted to the individual based on a variety of factors.

With continued reference to FIGS. 1 and 2, generating module 124 includes a set of programming instructions in Q&A identification program 120, to generate a set of personalized questions, for the user, related to the dataset by utilizing sentence-based machine translation (SBMT) and natural language processing (NLP) tools (step 204). The set of programming instructions are executable by a processor.

In exemplary embodiments, SBMT is one mode of statistical machine translation and uses predictive modeling to translate defined content. SBMT models are created with the help of, or learned from, unstructured sets of defined content. For example, it starts with paraphrasing a word, phrase, sentence, or longer text segments from its original surface form to an alternative surface form without changing the semantic meaning of the content.

In exemplary embodiments, SBMT provides an extensive neural machine translation and sentence-based machine translation to extract questions and possible answers from a wide range of defined content.

In exemplary embodiments, SBMT conducts a sentence-by-sentence literal translation of the content and compiles various question, and associated answers, that connect logically with the content. SBMT is further capable of translating diagrammatic information within the content. For example, information contained within charts, diagrams, and so forth.

In exemplary embodiments, generating module 124 generates all possible multi-dimensional questions and answers, associated with the content, which activates a vector matrix from customized dimensions of various demographic segments, and scores the questions. The scoring may be based on relevance to a plurality of users, associated knowledge base of a plurality of users, and so forth.

In various embodiments, SBMT can detect incorrectly translated words or word groups. SBMT may also source multiword expressions in content that fail to treat a multi-word expression as a whole and provide logical interpretation of a context.

In exemplary embodiments, generating module 124 generates the set of personalized questions for the user and takes into consideration previous learning material and previous evaluation scores of the user.

In alternative embodiments, generating module 124 generates the set of personalized questions for the user and additionally takes into consideration various factors of the user consisting of: age, gender, profession, speech, and one or more other demographic segments.

In exemplary embodiments, Q&A identification program 120 utilizes SBMT to learn good/valid questions for individual users based on the dataset. As such, representations of the dataset are critical to SBMT. For example, textual sentences are fed to the SBMT architecture as indexes taken from a finite dictionary (D), where D is the collection of possible words, phrases, and sentences that will represent the entire topic evaluation process.

With reference to an illustrative example, the following sentences are fed into the SBMT architecture: "I was born in 1999. I am living in city X and I am a qualified cardiologist. I have a lot of opportunities in city X." Generating module 124 generates the following set of personalized questions related to the dataset: Does city X, where cardiologists live, have more opportunities? Do cardiologists have a lot of opportunities in city X? Is it true that people born in 1999 are qualified cardiologists?

Based on the multi-layer neural network architecture that can handle several NLP tasks with both speed and accuracy, all the questions in the dataset are now a part of dictionary (D). As per the illustrative example, if a user is looking specifically for information about cardiologists, then the tone of the questions will be different. If a user needs to know more information about city X and opportunities there, then the tone of the questions will be different. In exemplary embodiments, each sentence in the illustrative example receives an internal dimensional feature vector representation by the lookup table layer. Support vectors produced by the lookup table layer need to be combined in subsequent layers of the neural network to produce a tag decision for each word in a sentence of the dataset. Producing tags for each element in variable length sequences (e.g., in this example, a sentence is a sequence of meaningful words) is a standard problem in machine learning.

In exemplary embodiments, a probabilistic neural network (PNN) and the support vector machine (SVM) are applied to develop exemplary classification models.

Once the PNN is defined, vectors may be fed into the PNN and classified in various ways.

The approaches of converting a multi-class classification problem into a binary classification problem is required when using the binary SVM classifier for the NLP applications. For example, all possible questions are part of dictionary (D) and W E D, where W are sentences.

Given an SVM classifier (in primal form) W={w1, ..., w1} and "b" and an example X={x1, ..., x1}, the margin of the example X to the SVM is as "b" is the linear coefficient:

$$m(X,W) = <X,W> + B = \Sigma x_i w_i + b \qquad (1)$$

In exemplary embodiments, generating module 124 generates all possible multi-dimensional questions and answers which activate the vector matrix based on customized dimensions of demographic segments, and then scores the questions.

For example, let the set of all context words (of all entity types) be E. Define $S(w_c,e)$ the set of all sentences where both the word $w_c \in W$ and entity type $e \in E$ are present. Based on the foregoing, it is said that an entity type "e" is present in a sentence S. Let $F(w_c,e)$ be the size of set $Sw_c,e$ and $wc \in S$. The representation of word $w_c$ with a random word representation is called $L_2(w_c,w_e,S)$. We compute the final score for this instance $L(w_c,w_e,S)$ as:

$$L(w_c,w_e,S)=L_1(w_c,w_e,S)-L_2(w_c,w_e,S)/L_2(w_c,w_e,S) \quad (2)$$

With continued reference to FIGS. 1 and 2, identifying module 126 includes a set of programming instructions in Q&A identification program 120, to identify a plurality of answers for the set of personalized questions for the user, based on collective information available in the dataset (step 206). The set of programming instructions are executable by a processor.

In exemplary embodiments, identifying module 126 can determine a defined subject matter for the set of personalized questions for the user, based on the dataset. Identifying module 126 further discriminates, via a SVM, one or more categories of information from the dataset, and calculates one or more classification parameters using SVM learning.

In exemplary embodiments, each time the equation runs it will learn and store multi-dimensional questions and answers. For example, the questions and context of various words will be different for a student versus a skilled professor. The model learns to propose expected questions and likelihood of answers as per geographical dimensions.

In exemplary embodiments, SBMT learns from geometric progression limit to the content limits. Each form question may not be as straightforward as the contents covered in the documents. Each time the readiness/structure of the questionnaire becomes more complex, for example if the contents comprise 10 pages, then the progression on the SBMT model would be less compared to 100 pages of content. The geometric progression may be illustrated as follows, where "n" is the number of terms derived from the content size, where $r \neq 0$, and where "r" is the common ratio, and "a" is a scale fact: $ar^0=a$, $ar^1=ar$, $ar^2$, $ar^3$, ... $ar^a$ Based on the foregoing geometric progression illustration above, and with time, the model trains itself based on the expected complexity with the addition of new contents of data.

In exemplary embodiments, question complexity is defined by its weight. The weight may be the same two questions. Geometric sequence each term is found by multiplying the pervious term by its weight. For example: {1, 1×2, 1×22, 1×23, ... }

Two consecutive questions having the same weight, that we call the constant ratio, is denoted by the letter "r".

With continued reference to FIGS. 1 and 2, providing module 126 includes a set of programming instructions in Q&A identification program 120, to provide to the user the plurality of answers for the set of personalized questions for verification and evaluation (step 208). The set of programming instructions are executable by a processor.

In exemplary embodiments, providing module 126 notifies and provides information about the content to the user.

In exemplary embodiments, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth® network, a WiFi network, a vehicle-to-vehicle (V2V) network, a vehicle-to-infrastructure (V2I) network, a peer-to-peer (P2P) communication network, a mesh network, or a combination thereof. In general, network 102 can be any combination of connections and protocols that will support communications between host server 110, computing device 130, and server 140.

Figure 3:
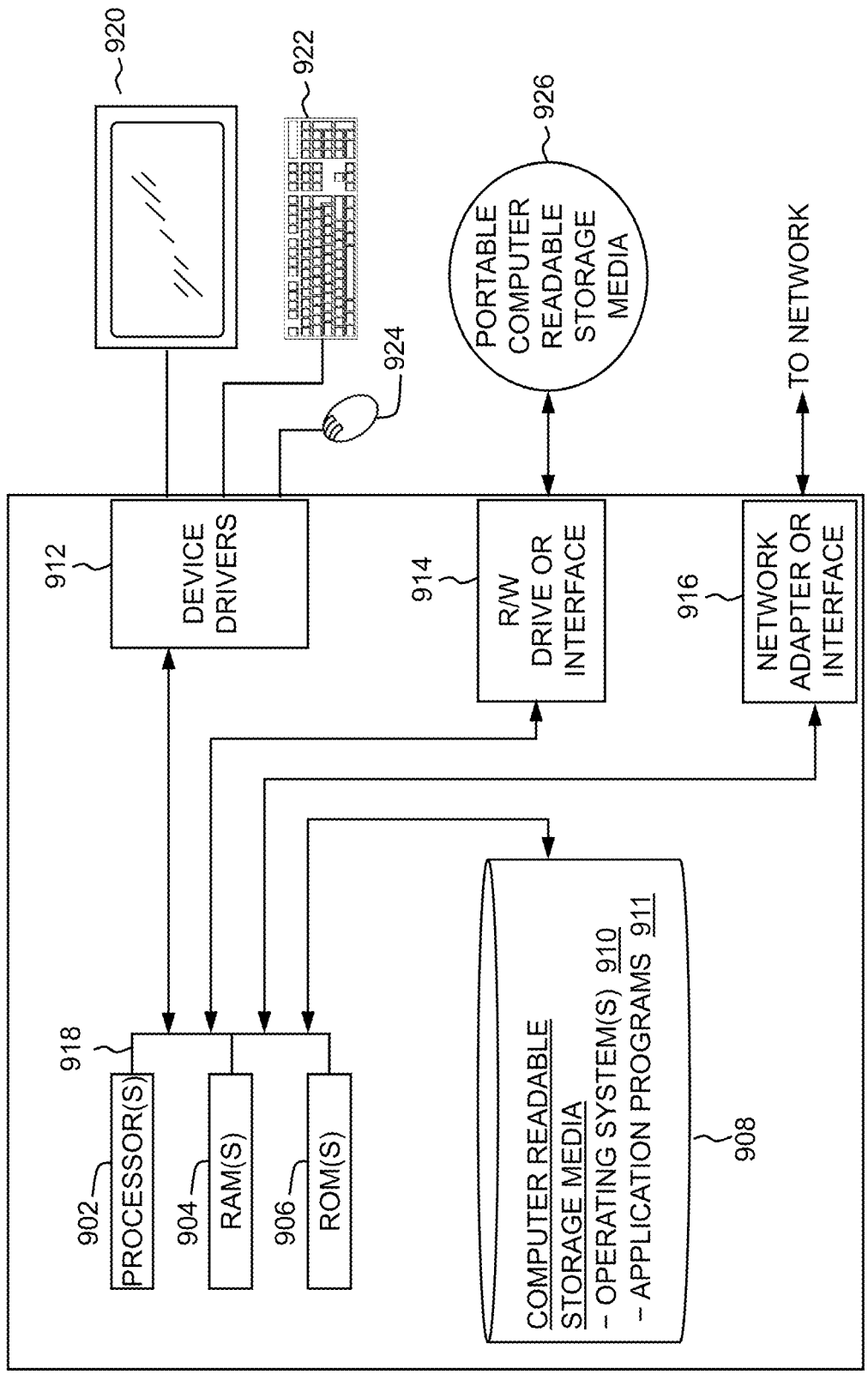
FIG. 3 is a block diagram depicting the hardware components of the Q&A identifying environment of FIG. 1, in accordance with an embodiment of the present invention.

FIG. 3 is a block diagram depicting components of a computing device (such as host server 110, as shown in FIG. 1), in accordance with an embodiment of the present invention. It should be appreciated that FIG. 3 provides only an illustration of one implementation and does not imply any limitations regarding the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, such as Q&A identification program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on computing device of FIG. 3 may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
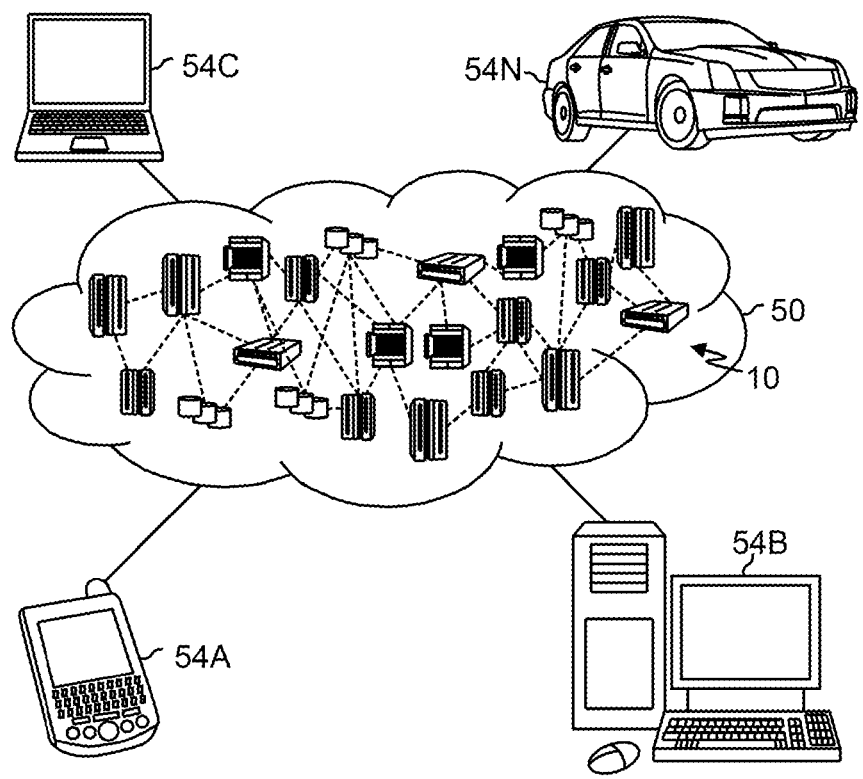
FIG. 4 is a diagram depicting a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
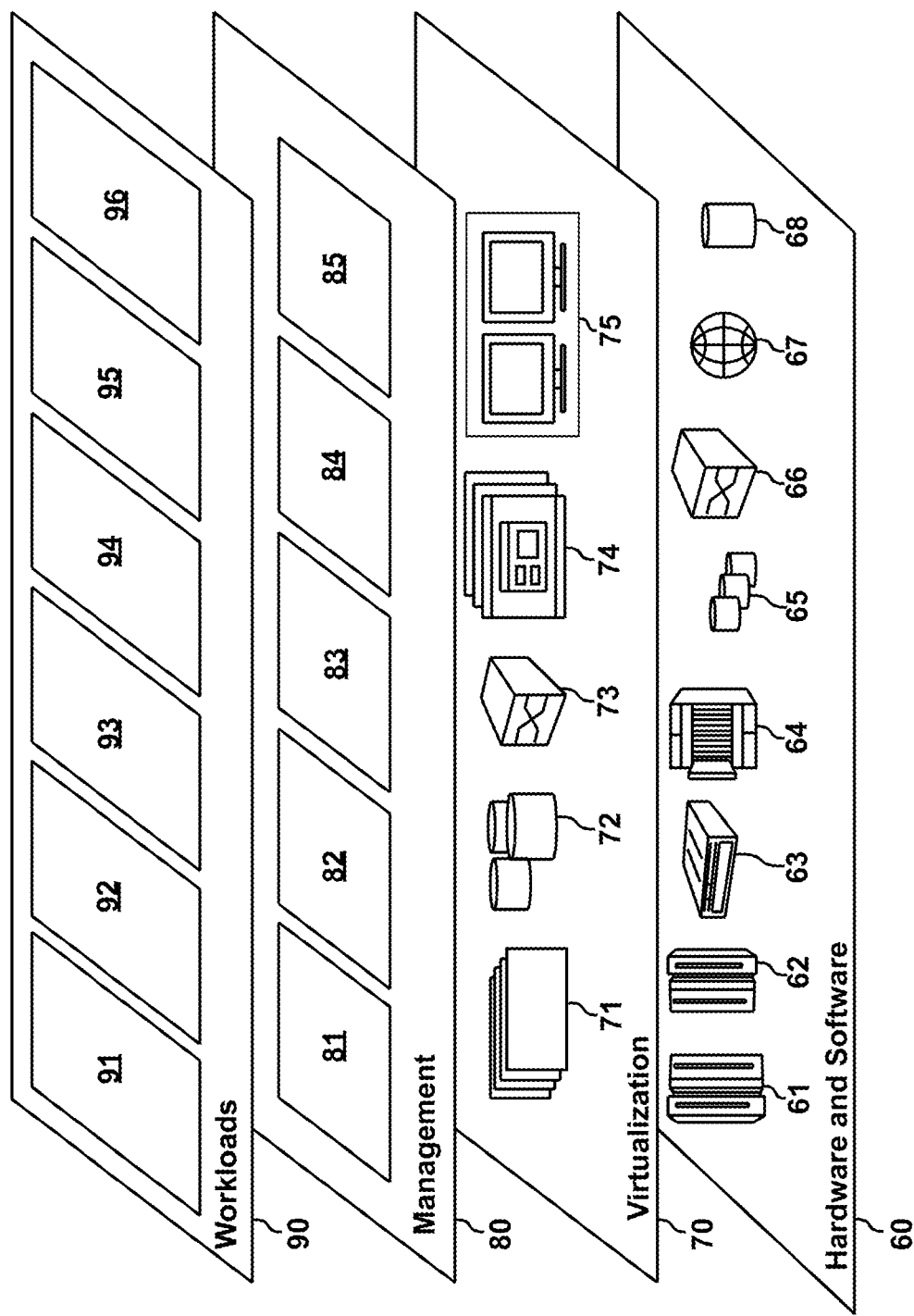
FIG. 5 is a diagram depicting abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for providing a framework to identify questions and answers dynamically from a dataset based on previous learning material and an evaluation score of a user, comprising:

creating a library of potential questions and answers from the dataset based on the previous learning material and evaluation score of the user;

generating a set of personalized questions and answers, for the user, related to the dataset by utilizing sentence-based machine translation (SBMT) model and natural language processing (NLP) tools, wherein the SBMT model learns from geometric progression limit to data content limits;

performing dynamic information extraction, categorization, clustering, summarization, indexing, and statistical machine translation, by the SBMT model and NLP tools, on a large volume of key content;

based on the geometric progression, and with time, the SBMT model trains itself based on expected complexity with addition of new contents of data;

identifying a plurality of answers for the set of personalized questions for the user, based on collective information available in the dataset, wherein the collective information available in the dataset includes information available via pictures and diagrams;

incorporating the SBMT model and NLP tools to understand sentences within the dataset and proposing higher probability questions driven from content which relates to many topics of a defined subject, wherein the higher probability questions are more individually customized to the user with each iteration of the geometric progression; and providing, to the user, the plurality of answers for the set of personalized questions for verification and evaluation.

2. The computer-implemented method of claim 1, further comprising:

performing dynamic information extraction, automatic categorization and clustering, automatic summarization and indexing, and statistical machine translation on the dataset.

3. The computer-implemented method of claim 1, wherein generating the set of personalized questions for the user comprises considering previous learning material and previous evaluation scores of the user.

4. The computer-implemented method of claim 1, wherein generating the set of personalized questions comprises considering various factors of the user consisting of: age, gender, profession, and speech.

5. The computer-implemented method of claim 1, further comprising:

determining a defined subject matter for the set of personalized questions for the user, based on the dataset;

discriminating, via a support vector machine (SVM), one or more categories of information from the dataset; and calculating one or more classification parameters using support vector machine learning.

6. The computer-implemented method of claim 5, wherein one or more support vectors are combined in subsequent layers of a neural network to produce a tag decision for each word in a sentence of the dataset.

7. A computer program product for providing a framework to identify questions and answers dynamically from a dataset based on previous learning and an evaluation score of a user, comprising a non-transitory tangible storage device having program code embodied therewith, the program code executable by a processor of a computer to perform a method, the method comprising:

creating a library of potential questions and answers from the dataset based on the previous learning material and evaluation score of the user;

generating a set of personalized questions and answers, for the user, related to the dataset by utilizing sentence-based machine translation (SBMT) model and natural language processing (NLP) tools, wherein the SBMT model learns from geometric progression limit to data content limits;

performing dynamic information extraction, categorization, clustering, summarization, indexing, and statistical machine translation, by the SBMT model and NLP tools, on a large volume of key content;

based on the geometric progression, and with time, the SBMT model trains itself based on expected complexity with addition of new contents of data;

identifying a plurality of answers for the set of personalized questions for the user, based on collective information available in the dataset, wherein the collective information available in the dataset includes information available via pictures and diagrams;

incorporating the SBMT model and NLP tools to understand sentences within the dataset and proposing higher probability questions driven from content which relates to many topics of a defined subject, wherein the higher probability questions are more individually customized to the user with each iteration of the geometric progression; and providing, to the user, the plurality of answers for the set of personalized questions for verification and evaluation.

8. The computer program product of claim 7, further comprising:
performing dynamic information extraction, automatic categorization and clustering, automatic summarization and indexing, and statistical machine translation on the dataset.

9. The computer program product of claim 7, wherein generating the set of personalized questions for the user comprises considering previous learning material and previous evaluation scores of the user.

10. The computer program product of claim 7, wherein generating the set of personalized questions comprises considering various factors of the user consisting of: age, gender, profession, and speech.

11. The computer program product of claim 7, further comprising:
determining a defined subject matter for the set of personalized questions for the user, based on the dataset;
discriminating, via a support vector machine (SVM), one or more categories of information from the dataset; and
calculating one or more classification parameters using support vector machine learning.

12. The computer program product of claim 11, wherein one or more support vectors are combined in subsequent layers of a neural network to produce a tag decision for each word in a sentence of the dataset.

13. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
creating a library of potential questions and answers from the dataset based on the previous learning material and evaluation score of the user;
generating a set of personalized questions and answers, for the user, related to the dataset by utilizing sentence-based machine translation (SBMT) model and natural language processing (NLP) tools, wherein the SBMT model learns from geometric progression limit to data content limits;
performing dynamic information extraction, categorization, clustering, summarization, indexing, and statistical machine translation, by the SBMT model and NLP tools, on a large volume of key content;
based on the geometric progression, and with time, the SBMT model trains itself based on expected complexity with addition of new contents of data;
identifying a plurality of answers for the set of personalized questions for the user, based on collective information available in the dataset, wherein the collective information available in the dataset includes information available via pictures and diagrams;
incorporating the SBMT model and NLP tools to understand sentences within the dataset and proposing higher probability questions driven from content which relates to many topics of a defined subject, wherein the higher probability questions are more individually customized to the user with each iteration of the geometric progression; and
providing, to the user, the plurality of answers for the set of personalized questions for verification and evaluation.

14. The computer system of claim 13, further comprising:
performing dynamic information extraction, automatic categorization and clustering, automatic summarization and indexing, and statistical machine translation on the dataset.

15. The computer system of claim 13, wherein generating the set of personalized questions for the user comprises considering previous learning material and previous evaluation scores of the user.

16. The computer system of claim 13, wherein generating the set of personalized questions comprises considering various factors of the user consisting of: age, gender, profession, and speech.

17. The computer system of claim 13, further comprising:
determining a defined subject matter for the set of personalized questions for the user, based on the dataset;
discriminating, via a support vector machine (SVM), one or more categories of information from the dataset; and
calculating one or more classification parameters using support vector machine learning.

* * * * *